United States Patent
Wang et al.

(10) Patent No.: US 11,493,452 B2
(45) Date of Patent: Nov. 8, 2022

(54) ROTATING SEAL-TYPE LIQUID TESTING APPARATUS

(71) Applicant: HANGZHOU ALLTEST BIOTECH CO., LTD, Hangzhou (CN)

(72) Inventors: Haijian Wang, Hangzhou (CN); Weike Lu, Hangzhou (CN); Fei Gao, Hangzhou (CN); Yao Xiong, Hangzhou (CN)

(73) Assignee: HANGZHOU ALLTEST BIOTECH CO., LTD, Hangzhou (CN)

( * ) Notice: Subject to any disclaimer, the term of this patent is extended or adjusted under 35 U.S.C. 154(b) by 348 days.

(21) Appl. No.: 16/899,589

(22) Filed: Jun. 12, 2020

(65) Prior Publication Data
US 2020/0309709 A1 Oct. 1, 2020

Related U.S. Application Data

(63) Continuation-in-part of application No. PCT/CN2019/114938, filed on Nov. 1, 2019.

(30) Foreign Application Priority Data

Nov. 2, 2018 (CN) .......................... 201821802465.9

(51) Int. Cl.
*G01N 21/78* (2006.01)
*B01L 3/00* (2006.01)
*B04B 5/04* (2006.01)

(52) U.S. Cl.
CPC .............. *G01N 21/78* (2013.01); *B01L 3/565* (2013.01); *B04B 5/0442* (2013.01); *B04B 2005/0464* (2013.01)

(58) Field of Classification Search
CPC ......... E02F 3/435; E02F 3/438; E02F 9/2029; E02F 9/2041; G01F 22/00; G01G 19/00;
(Continued)

(56) References Cited

U.S. PATENT DOCUMENTS 8,163,253 B1 4/2012 Hartselle
2012/0291565 A1* 11/2012 Ludowise ......... B01L 3/502738
73/863.86
2013/0112016 A1 5/2013 Hansen

FOREIGN PATENT DOCUMENTS

CN 201229345 Y 4/2009
CN 201464268 U 5/2010
(Continued)

OTHER PUBLICATIONS

English translation of Chinese Publication CN 107782906 A (Year: 2016).*

*Primary Examiner* — Jennifer Wecker
*Assistant Examiner* — Jonathan Bortoli
(74) *Attorney, Agent, or Firm* — Bayramoglu Law Offices LLC

(57) ABSTRACT

A rotating seal-type liquid testing apparatus includes a lower cup component, an upper cup body, a top cover and a testing element. The lower cup component includes a lower cup body, a high liquid baffle, a low liquid baffle and a water-absorbing sealing plug. The low liquid baffle and the high liquid baffle divide a bottom of an inner cavity of the lower cup body into a reaction region and a cut-off region. An edge of a bottom surface of the inner cavity of the lower cup body is provided with a vent hole, and the vent hole is positioned in the cut-off region. The upper cup body is disposed in the lower cup body, a bottom surface of an inner cavity of the upper cup body is provided with a liquid outlet, and the liquid outlet is connected to the reaction region in the lower cup body.

11 Claims, 4 Drawing Sheets

(58) Field of Classification Search
CPC ......... H01L 23/4951; B01L 2200/0689; B01L 2300/069; B01L 2300/0825; B01L 2300/0851; B01L 2400/0644; B01L 3/5023; B01L 3/565; B04B 2005/0464; B04B 5/0442; G01N 21/01; G01N 21/78
See application file for complete search history.

(56) References Cited

FOREIGN PATENT DOCUMENTS

| CN | 107782906 A | * | 3/2018 |
|----|-------------|---|--------|
| CN | 107782906 A |   | 3/2018 |
| CN | 209471033 U |   | 10/2019 |

* cited by examiner

ROTATING SEAL-TYPE LIQUID TESTING APPARATUS

CROSS REFERENCE TO THE RELATED APPLICATIONS

This application is the continuation-in-part application of International Application No. PCT/CN2019/114938, filed on Nov. 1, 2019, which is based upon and claims priority to Chinese Patent Application No. 201821802465.9, filed on Nov. 2, 2018, the entire contents of which are incorporated herein by reference.

TECHNICAL FIELD

The present invention belongs to the technical field of liquid testing, and specifically relates to a rotating seal-type liquid testing apparatus.

BACKGROUND

The apparatus is suitable for detecting whether a sample contains a specific substance, can rapidly detect multiple analytical substances at the same time, can be widely applied to the field of rapid liquid testing, such as early pregnancy testing, medicine abuse testing, and rapid drug testing, and can be widely applied to hospitals, drug rehabilitation centers, physical examination centers and other places. In the traditional technology, although a traditional liquid testing apparatus can rapidly and accurately detect results, the traditional liquid testing apparatus has many structural units, many operation steps and relatively complicated production processes. In addition, the traditional liquid testing apparatus cannot accurately control the volume of the liquid for testing, and cannot automatically reserve a part of uncontaminated liquid for later secondary testing.

SUMMARY

An objective of the present invention is to provide a rotating seal-type liquid testing apparatus.

The rotating seal-type liquid testing apparatus of the present invention includes a lower cup component, an upper cup component, a top cover and a testing element. The lower cup component includes a lower cup body, a high liquid baffle, a low liquid baffle and a water-absorbing sealing plug. Both the low liquid baffle and the high liquid baffle are fixed at a bottom of an inner cavity of the lower cup body, and the low liquid baffle and the high liquid baffle divide the bottom of the inner cavity of the lower cup body into a reaction region and a cut-off region. An edge of a bottom surface of the inner cavity of the lower cup body is provided with a vent hole, the vent hole is positioned in the cut-off region, and the vent hole is embedded with a water-absorbing sealing plug. The upper cup component includes an upper cup body, the upper cup body is disposed in the lower cup body, a bottom surface of an inner cavity of the upper cup body is provided with a liquid outlet, and the liquid outlet is connected with the reaction region in the lower cup body. The top cover is detachably fixed at a top of the upper cup body, and the testing element is positioned between an outer side surface of the upper cup body and an inner side surface of the lower cup body and positioned in the reaction region of the inner cavity of the lower cup body.

Preferably, the lower cup component further includes a buffer table. The buffer table is fixed on the bottom surface of the inner cavity of the lower cup body. A top surface of the buffer table is provided with a buffer groove. A side surface of the buffer table is provided with guide grooves. Top ends of the guide grooves are communicated with the buffer groove. Bottom ends of the guide grooves are connected with the reaction region at the bottom of the inner cavity of the lower cup body. The upper cup component further includes a guide nozzle. The guide nozzle is disposed at the liquid outlet in the bottom surface of the inner cavity of the upper cup body. The guide nozzle extends into the buffer groove on the buffer table.

Preferably, the material of the water-absorbing sealing plug is polyvinyl alcohol. Preferably, the lower cup component further includes testing card blocks, and two of the testing card blocks are both fixed on the inner side surface of the lower cup body and respectively positioned right above the high liquid baffle and the low liquid baffle.

Preferably, the testing element includes testing test strips and a fixed plate. The fixed plate is composed of positioning strips and an arc-shaped plate. Two of the positioning strips are respectively fixed at two ends of the arc-shaped plate. An outer side surface of the arc-shaped plate is provided with a plurality of test strip placing grooves. The testing test strips are fixed in the test strip placing grooves. Bottom ends of all of the testing test strips are lower than a top edge of the low liquid baffle. The two of the positioning strips are in contact with the two of the testing card blocks respectively.

As an improved scheme, the testing element includes testing test strips and a fixed plate. The fixed plate is composed of two positioning strips and an arc-shaped plate connected between the two positioning strips. The sides of the positioning strips facing the arc-shaped plate are provided with vertical grooves. The arc-shaped plate is connected in the vertical grooves movably up and down. An outer side surface of the arc-shaped plate is provided with a plurality of test strip placing grooves. The testing test strips are fixed in the test strip placing grooves. Lower parts of the testing test strips are provided with tearing cracks at the same horizontal height. The tearing cracks divide the testing test strips into upper and lower sections. The length of the vertical groove is the same as the length of the lower section of the testing test strip. The tearing cracks on the testing test strips are lower than a lower end part of the arc-shaped plate. Bottom ends of all of the testing test strips are lower than a top edge of the low liquid baffle. The two positioning strips abut against the two of the testing card blocks respectively. The tearing cracks are disposed at the lower parts of the testing test strips, so that the same testing test strip can be used twice. During primary testing, the arc-shaped plate is positioned at the uppermost ends of the vertical grooves, and the lower parts of the lower sections of the testing test strips below the tearing cracks are immersed in the liquid to be detected for testing. The tearing cracks in the present invention have the effects of easily breaking and preventing the liquid to be detected from penetrating into the upper sections of the testing test strips. When secondary testing is required, the lower sections of the testing test strips can be removed, and the arc-shaped plate can be moved to the lowermost ends of the vertical grooves. Since the length of the vertical groove is the same as the length of the lower section of the testing test strip, the positions of the bottom ends of the testing test strips is the same as those in the primary testing, and the secondary testing can be completed by using the upper sections of the testing test strips. Since the upper and lower sections of the testing test strip belong to two parts of the same testing test strip, the technical indexes of the upper and lower sections of the testing test strip are exactly the same, and the testing results should also be completely consistent, which can avoid the difference in testing results due to different testing test strips that may occur when the testing test strips are replaced for the secondary testing, thereby affecting the accuracy of the testing results.

Preferably, the middle part of a concave surface (namely back surfaces of the test strip placing grooves) of the arc-shaped plate is embedded with magnetic conduction sheets or permanent magnet sheets. When secondary testing is required, the magnetic conduction sheets (such as iron sheets) or the permanent magnet sheets at the middle part of the concave surface of the arc-shaped plate are used. Under the condition that the upper cup body and the lower cup body are not opened, magnets (corresponding to the magnetic conduction sheets) or magnetizers (corresponding to the permanent magnet sheets) may be disposed outside the lower cup body in positions corresponding to the magnetic conduction sheets or the permanent magnet sheets. Through the movement of the magnets or the magnetizers, the arc-shaped plate can be moved downward along the vertical grooves, and the arc-shaped plate and the testing test strips can be moved downward, so as to achieve the purpose of the secondary testing.

Preferably, the upper cup component further includes a connecting cylinder and a connecting ring plate. The middle part of an inner side surface of the connecting cylinder is fixed with an outer edge of the connecting ring plate. An inner edge of the connecting ring plate is fixed with a top end of the upper cup body. A bottom of the connecting cylinder is in threaded connection with a top of the lower cup body. A top of the connecting cylinder is in threaded connection with the top cover.

Preferably, the upper cup component further includes a temperature test strip, and the temperature test strip is fixed at a bottom of an inner side surface of the upper cup body.

Preferably, the bottom of the connecting cylinder is provided with an upper sealing line, and the top of the lower cup body is provided with a lower sealing line corresponding to the upper sealing line.

Preferably, a first sealing ring is disposed between the upper cup component and the lower cup component, and a second sealing ring is disposed between the upper cup component and the top cover.

The present invention has the following beneficial effects:

1. In the present invention, through the characteristic that the water-absorbing sealing plug is airtight after sucking a liquid and being sealed, quantitative testing of the detected liquid is realized. Furthermore, uncontaminated detected liquid is reserved so as to facilitate secondary confirmation testing.

2. By adopting a rotating seal manner, in the aspect of production process, the present invention solves the problems of many structural units, many operation steps and relatively complicated production processes in a traditional liquid testing apparatus, and simplifies the production processes to a certain extent.

3. The present invention is provided with the temperature test strip which can judge whether the detected liquid is in a normal state in combination with the temperature, so as to improve the reliability of testing.

4. The present invention has a novel design and an exquisite structure. The introduction of the concept of a sealed space solves the phenomenon that chromatography cannot be carried out smoothly due to excessive extrusion of testing reagent strips in traditional liquid testing apparatuses.

5. The testing element of the present invention can be moved up and down. In combination with the tearing cracks disposed on the testing test strips, the same testing test strip can be used twice, so as to avoid the difference in testing results due to different testing test strips during the secondary testing, thereby ensuring the accuracy of the testing results.

DETAILED DESCRIPTION

The technical schemes of the present invention will be further illustrated in detail below through embodiments in conjunction with the drawings.

Embodiment 1

Figure 1:
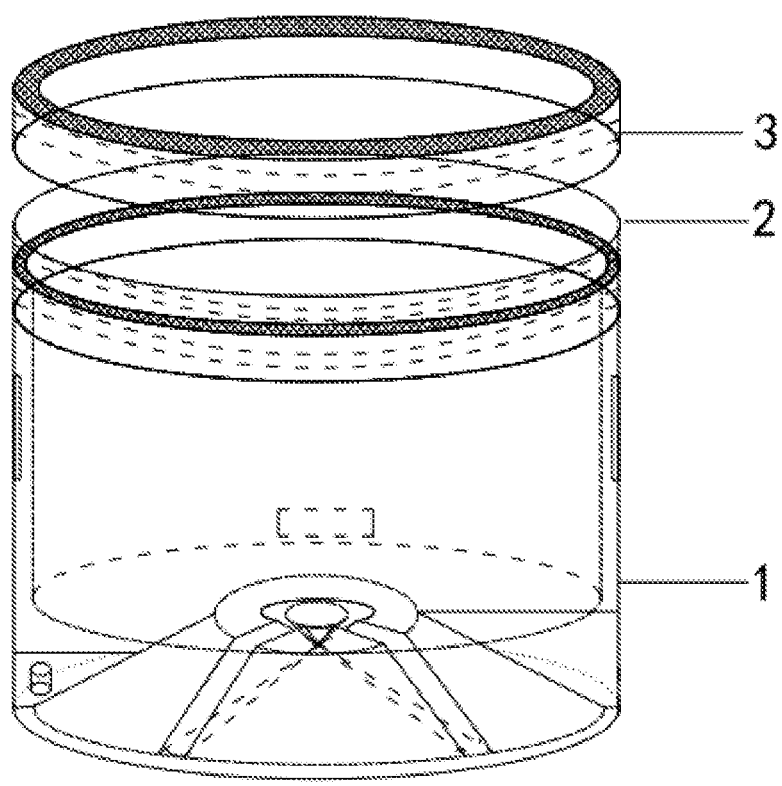
FIG. 1 is a schematic diagram of an overall structure of the present invention.

In an embodiment 1 as shown in FIG. 1, a rotating seal-type liquid testing apparatus includes a lower cup component 1, an upper cup component 2, a top cover 3 and a testing element.

Figure 2:
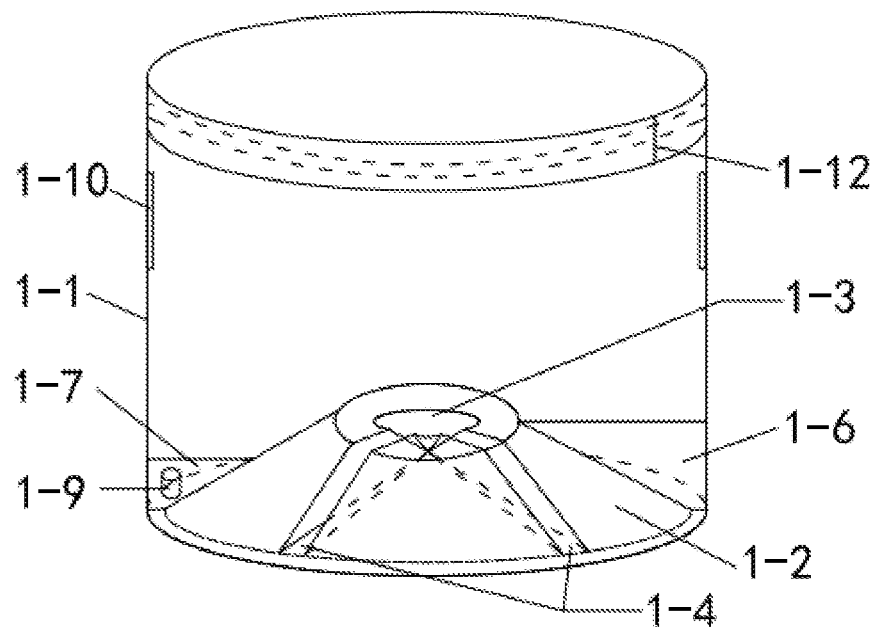
FIG. 2 is a schematic three-dimensional diagram of a lower cup component of the present invention.
Figure 3:
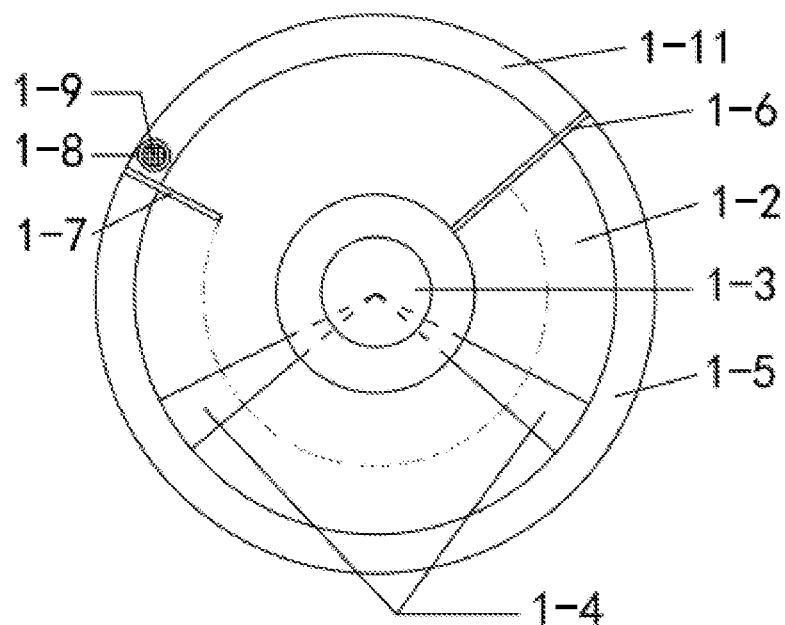
FIG. 3 is a top view of the lower cup component of the present invention.

As shown in FIGS. 1, 2 and 3, the lower cup component 1 includes a lower cup body 1-1, a buffer table 1-2, a high liquid baffle 1-6, a water-absorbing sealing plug 1-9, testing card blocks 1-10 and a low liquid baffle 1-7. A top of an outer side surface of the lower cup body 1-1 is provided with a first external thread, and a vertical lower sealing line 1-12 is disposed at the first external thread of the lower cup body 1-1. A buffer table 1-2 is fixed on a bottom surface of an inner cavity of the lower cup body 1-1, the buffer table 1-2 is in a shape of a circular truncated cone, and both the low liquid baffle 1-7 and the high liquid baffle 1-6 are fixed at a bottom of the inner cavity of the lower cup body 1-1. Two side edges and bottom edge of the low liquid baffle 1-7 are respectively attached to a side surface of the buffer table 1-2 and the side surface and bottom surface of the inner cavity of the lower cup body 1-1. Two side edges and bottom edge of the high liquid baffle 1-6 are respectively attached to the side surface of the buffer table 1-2 and the side surface and bottom surface of the inner cavity of the lower cup body 1-1. A top edge of the low liquid baffle 1-7 is higher than a top edge of the high liquid baffle 1-6, and the low liquid baffle 1-7 and the high liquid baffle 1-6 divide the bottom of the inner cavity of the lower cup body 1-1 into a reaction region 1-5 and a cut-off region 1-11, so that liquid in the reaction region cannot enter the cut-off region 1-11 before the liquid level reaches the top edge of the low liquid baffle 1-7. Two of the testing card blocks 1-10 are both fixed on an inner side surface of the lower cup body 1-1 and respectively positioned right above the high liquid baffle 1-6 and the low liquid baffle 1-7.

A top surface of the buffer table 1-2 is provided with a buffer groove 1-3. The buffer groove 1-3 is in a conical shape. A side surface of the buffer table is provided with two guide grooves 1-4. Top ends of the guide grooves 1-4 are communicated with an inner side surface of the buffer groove 1-3, and bottom ends of the guide grooves are connected with the reaction region 1-5 at the bottom of the inner cavity of the lower cup body 1-1. The guide grooves 1-4 are configured to guide the liquid in the buffer groove 1-3 to a bottom of the lower cup body 1-1.

An edge of the bottom surface of the inner cavity of the lower cup body 1-1 is provided with a vent hole 1-8. The vent hole 1-8 is positioned in the cut-off region 1-11. The vent hole 1-8 is embedded with a water-absorbing sealing plug 1-9. The material of the water-absorbing sealing plug 1-9 is polyvinyl alcohol. The water-absorbing sealing plug 1-9 has the characteristics of being air permeable when dry and airtight after absorbing water (to achieve a sealing effect). In a state that the water-absorbing sealing plug 1-9 does not absorb liquid, the inner cavity of the lower cup body 1-1 is communicated with the external environment. In a state that the water-absorbing sealing plug 1-9 absorbs liquid, the inner cavity of the lower cup body 1-1 is separated from the external environment through the water-absorbing sealing plug 1-9.

Figure 4:
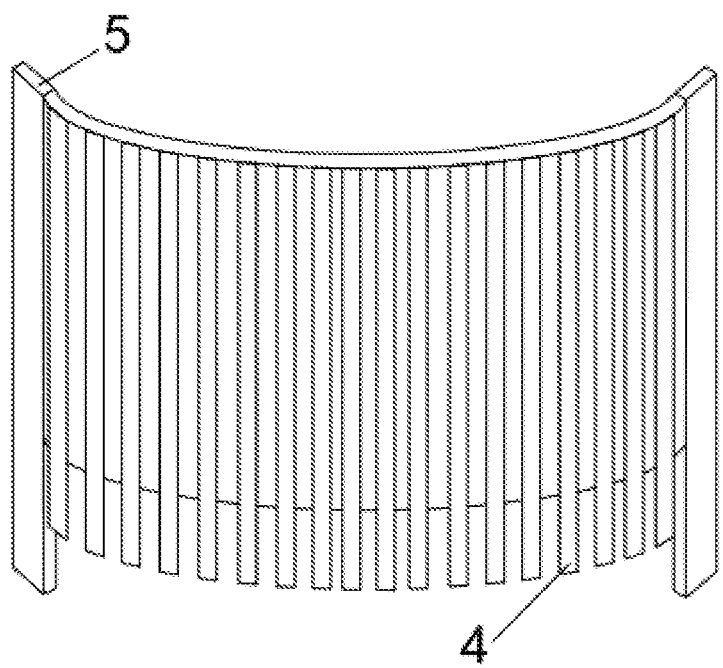
FIG. 4 is a schematic structural diagram of a testing element of the present invention.

As shown in FIG. 4, the testing element includes testing test strips 4 and a fixed plate 5. The fixed plate 5 is composed of positioning strips and an arc-shaped plate. Two of the positioning strips are respectively fixed at two ends of the arc-shaped plate. Top end parts of the two of the positioning strips are flush with a top edge of the arc-shaped plate. An outer side surface of the arc-shaped plate is provided with a plurality of test strip placing grooves. The testing test strips 4 are fixed in the test strip placing grooves. Bottom ends of all of the testing test strips 4 are lower than a bottom edge of the arc-shaped plate and higher than bottom end parts of the positioning strips.

The testing element is fixed in the reaction region 1-5 of the lower cup body 1-1, and the outer side surface of the arc-shaped plate is attached to an inner side wall of the lower cup body 1-1. Bottom ends of the positioning strips are in contact with the bottom surface of the inner cavity of the lower cup body 1-1. Bottom end parts of the testing test strips 4 are lower than the top edge of the low liquid baffle 1-7. The two of the positioning strips are in contact with the two of the testing card blocks respectively.

Figure 5:
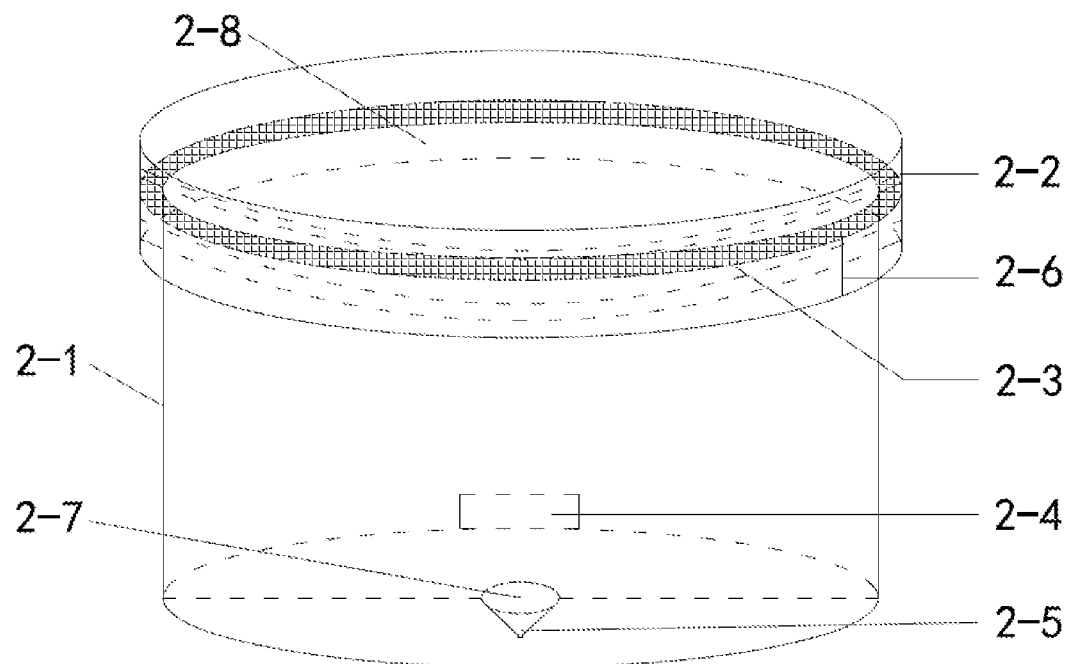
FIG. 5 is a schematic three-dimensional diagram of an upper cup component of the present invention.

As shown in FIG. 1 and FIG. 5, the upper cup component 2 includes an upper cup body 2-1, a connecting cylinder 2-2, a connecting ring plate 2-8, a first sealing ring 2-3, a temperature test strip 2-4 and a guide nozzle 2-5. The bottom surface of the inner cavity of the upper cup body 2-1 is provided with the liquid outlet 2-7. The middle part of an inner side surface of the connecting cylinder 2-2 is fixed with an outer edge of the connecting ring plate 2-8, and a bottom of the inner side surface of the connecting cylinder 2-2 is provided with a first internal thread. A top of an outer side surface of the connecting cylinder 2-2 is provided with a second external thread, and a vertical upper sealing line 2-6 is disposed at the first internal thread of the connecting cylinder 2-2. A first sealing ring 2-3 is fixed on a bottom surface of the connecting ring plate 2-8, and the first internal thread of the connecting cylinder 2-2 is in threaded connection with the first external thread of the lower cup body 1-1. In a state that the lower cup body 1-1 extrudes the first sealing ring 2-3 and the upper sealing line 2-6 is overlapped with the lower sealing line 1-12, air cannot enter the lower cup body 1-1 from the joint of the first internal thread and the first external thread.

A top end of the upper cup body 2-1 is fixed with an inner edge of the connecting ring plate 2-8. The temperature test strip 2-4 is fixed at a bottom of an inner side surface of the upper cup body 2-1. The funnel-shaped guide nozzle 2-5 is disposed at the middle part of the bottom surface of the inner cavity of the upper cup body 2-1, and the guide nozzle 2-5 extends into the buffer groove 1-3 on the buffer table 1-2. The inner cavity of the lower cup body 1-1 is communicated with the inner cavity of the upper cup body through the guide nozzle 2-5. The testing element is positioned between an outer side surface of the upper cup body 2-1 and the inner side surface of the lower cup body 1-1.

Figure 6:
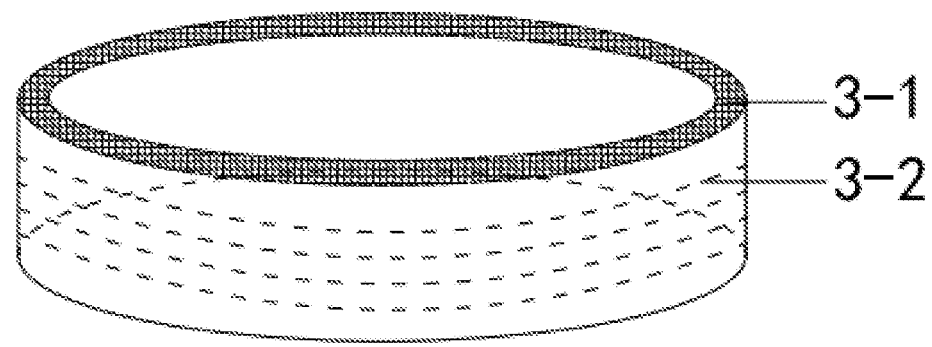
FIG. 6 is a schematic three-dimensional diagram of a top cover of the present invention.

As shown in FIGS. 1 and 6, a second internal thread 3-2 is disposed in the top cover 3. A second sealing ring 3-1 is fixed at a top of an inner side of the top cover 3. The second internal thread 3-2 on the top cover 3 is in threaded connection with the second external thread on the connecting cylinder 2-2. The second sealing ring 3-1 is configured to seal the top cover and the upper cup component 2.

The working principle of the embodiment 1 is as follows:

Step I: the testing element is fixed in the reaction region 1-5 of the lower cup body 1-1, and the outer side surface of the arc-shaped plate is attached to the inner side wall of the lower cup body 1-1. The bottom ends of the positioning strips are in contact with the bottom surface of the inner cavity of the lower cup body 1-1. The bottom end parts of the testing test strips 4 are lower than the top edge of the low liquid baffle 1-7. The two of the positioning strips are in contact with the two of the testing card blocks respectively. The lower cup body 1-1 of the lower cup component 1 and the connecting cylinder 2-2 of the upper cup component 2 are tightened to be in a state that the upper sealing line is aligned to the lower sealing line, and the first sealing ring 2-3 compresses a top edge of the lower cup body 1-1.

Step II: the top cover 3 is unscrewed, and the detected liquid is poured into the upper cup body;

Step III: the detected liquid flows into the buffer groove 1-3 of the buffer table 1-2 in the lower cup body 1-1 through the guide nozzle 2-5 in the upper cup body, and flows into the reaction region 1-5 of the lower cup body 1-1 through the two guide grooves 1-4 (at this time, the water-absorbing sealing plug 1-9 is not in contact with the liquid and is in a dry state, so that the inner cavity of the lower cup body 1-1 is communicated with the outside air through the vent hole 1-8, and flowing into the inner cavity of the lower cup body 1-1 through the vent hole 1-8, the air in the inner cavity of the lower cup body 1-1 is discharged to the external environment from the vent hole 1-8).

Step IV: the liquid level of the detected liquid in the reaction region 1-5 gradually rises to be in contact with the testing test strips 4. The testing test strips 4 chromatograph the detected liquid and a reaction is generated. After the liquid level of the detected liquid in the reaction region 1-5 reaches the top edge of the low liquid baffle 1-7, the detected liquid enters the cut-off region 1-11 and infiltrates the water-absorbing sealing plug 1-9. The water-absorbing sealing plug 1-9 is airtight after absorbing water, so that the inner cavity of the lower cup body 1-1 is completely isolated from the external environment. The air pressure formed in the inner cavity of the lower cup body 1-1 due to airtightness prevents the detected liquid from continuing to flow into the inner cavity of the lower cup body 1-1.

Since the liquid level of the reaction region 1-5 is controlled at the top edge of the low liquid baffle, the problem that the effective components of the testing test strips 4 are greatly dissolved due to too high liquid level can be avoided, so as to improve the accuracy of testing. At the same time, the detected liquid in the lower cup body 1-1 and the detected liquid in the upper cup body are physically separated and are not in contact, so that a part of the detected liquid is not contaminated by the testing test strips. If further testing is required, a part of liquid in the upper cup body can be directly taken to perform secondary testing or confirmation testing.

Step V: after the detected liquid fully reacts with the testing test strips, the maximum temperature in the testing process is obtained according to the color of the temperature test strip 2-4. Whether the detected liquid contains target substances corresponding to the testing test strips is judged according to the maximum temperature in the testing process and the colors of the testing test strips. Then, the top cover is screwed on.

Embodiment 2

Figure 7:
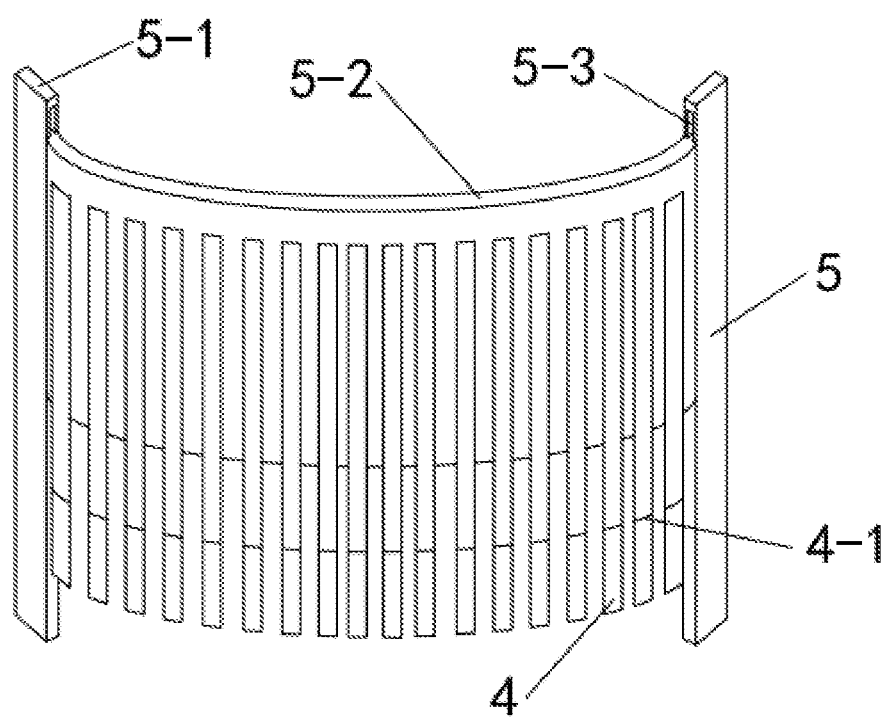
FIG. 7 is another schematic structural diagram of the testing element of the present invention.

In an embodiment 2 as shown in FIG. 7, a testing element includes testing test strips 4 and a fixed plate 5. The fixed plate 5 is composed of two positioning strips 5-1 and an arc-shaped plate 5-2 connected between the two positioning strips. The sides of the positioning strips 5-1 facing the arc-shaped plate 5-2 are provided with vertical grooves 5-3. The arc-shaped plate 5-2 is connected in the vertical grooves 5-3 movably up and down. An outer side surface of the arc-shaped plate 5-2 is provided with a plurality of test strip placing grooves. The testing test strips 4 are fixed in the test strip placing grooves. Lower parts of the testing test strips are provided with tearing cracks 4-1 at the same horizontal height. The tearing cracks 4-1 divide the testing test strips 4 into upper and lower sections. The length of the vertical groove 5-3 is the same as the length of the lower section of the testing test strip 4. The tearing cracks 4-1 on the testing test strips are lower than a lower end part of the arc-shaped plate 5-2. Bottom ends of all of the testing test strips 4 are lower than a top edge of a low liquid baffle 1-7. The two positioning strips 5-1 abut against two testing card blocks 1-10 respectively. The middle part of a concave surface of the arc-shaped plate is embedded with magnetic conduction sheets (not shown in the figure).

In the testing element of the present embodiment, the arc-shaped plate provided with the testing test strips can be moved up and down relative to the positioning strips. The lower parts of the testing test strips are provided with tearing cracks at the same horizontal height. The tearing cracks have the effects of easily breaking and preventing the liquid to be detected from penetrating into the upper sections of the testing test strips, and the same testing test strip can be used twice through the tearing cracks. During primary testing, the arc-shaped plate is pulled up and is positioned at the uppermost ends of the vertical grooves, at this time, the lower parts of the lower sections of the testing test strips below the tearing cracks are immersed in the liquid to be detected for testing, and the testing method is the same as the method in the embodiment 1. When secondary testing is required, the lower sections of the testing test strips can be removed, the arc-shaped plate can be moved downward to the lowermost ends of the vertical grooves, and the secondary testing can be completed by using the upper sections of the testing test strips. Since the upper and lower sections of the testing test strip belong to two parts of the same testing test strip, the technical indexes of the upper and lower sections of the testing test strip are exactly the same, and the testing results should also be completely consistent, which can avoid the difference in testing results due to different testing test strips that may occur when the testing test strips are replaced for the secondary testing, thereby affecting the accuracy of the testing results. For the structure in which the middle part of the concave surface of the arc-shaped plate is embedded with magnetic conduction sheets, when secondary testing is required, the magnetic conduction sheets (iron sheets) at the middle part of the concave surface of the arc-shaped plate are used. Under the condition that the upper cup body and the lower cup body are not opened, magnets may be disposed outside the lower cup body in positions corresponding to the magnetic conduction sheets, and the magnets adsorb the magnetic conduction sheets to move downward, that is, the arc-shaped plate can be moved downward along the vertical grooves, and the arc-shaped plate and the testing test strips can be moved downward, so as to achieve the purpose of the secondary testing.

What is claimed is:

1. A rotating seal-type liquid testing apparatus, comprising:
   a lower cup component,
   an upper cup component,
   a top cover, and
   a testing element;
   wherein
   the lower cup component comprises a lower cup body, a high liquid baffle, a low liquid baffle and a water-absorbing sealing plug; both the low liquid baffle and the high liquid baffle are fixed at a bottom of an inner cavity of the lower cup body; the low liquid baffle and the high liquid baffle divide the bottom of the inner cavity of the lower cup body into a reaction region and a cut-off region; an edge of a bottom surface of the inner cavity of the lower cup body is provided with a vent hole; the vent hole is positioned in the cut-off region; the water-absorbing sealing plug is embedded in the vent hole; the upper cup component comprises an upper cup body; the upper cup body is disposed in the lower cup body; a bottom surface of an inner cavity of the upper cup body is provided with a liquid outlet; the liquid outlet is connected to the reaction region in the lower cup body; the top cover is detachably fixed at a top of the upper cup body; and the testing element is positioned between an outer side surface of the upper cup body and an inner side surface of the lower cup body and positioned in the reaction region of the inner cavity of the lower cup body.

2. The rotating seal-type liquid testing apparatus according to claim 1, wherein, the lower cup component further comprises a buffer table, the buffer table is fixed on the bottom surface of the inner cavity of the lower cup body, a top surface of the buffer table is provided with a buffer groove, a side surface of the buffer table is provided with guide grooves, top ends of the guide grooves are connected to the buffer groove, bottom ends of the guide grooves are connected to the reaction region at the bottom of the inner cavity of the lower cup body, the upper cup component further comprises a guide nozzle, the guide nozzle is disposed at the liquid outlet in the bottom surface of the inner cavity of the upper cup body, and the guide nozzle extends into the buffer groove on the buffer table.

3. The rotating seal-type liquid testing apparatus according to claim 1, wherein, a material of the water-absorbing sealing plug is polyvinyl alcohol.

4. The rotating seal-type liquid testing apparatus according to claim 1, wherein, the lower cup component further comprises a plurality of testing card blocks, and two testing card blocks of the plurality of testing card blocks are both fixed on the inner side surface of the lower cup body and positioned right above the high liquid baffle and the low liquid baffle, respectively.

5. The rotating seal-type liquid testing apparatus according to claim 4, wherein, the testing element comprises testing test strips and a fixed plate, the fixed plate is composed of a plurality of positioning strips and an arc-shaped plate, two positioning strips of the plurality of positioning strips are respectively fixed at two ends of the arc-shaped plate, an outer side surface of the arc-shaped plate is provided with a plurality of test strip placing grooves, the testing test strips are fixed in the plurality of test strip placing grooves, a bottom end of each of the testing test strips is lower than a top edge of the low liquid baffle, and the two positioning strips of the plurality of positioning strips are in contact with the two testing card blocks of the plurality of testing card blocks, respectively.

6. The rotating seal-type liquid testing apparatus according to claim 4, wherein, the testing element comprises testing test strips and a fixed plate, the fixed plate is composed of two positioning strips and an arc-shaped plate, wherein the arc-shaped plate is connected between the two positioning strips, a side of each positioning strip of the two positioning strips is provided with a vertical groove, wherein the side of the each positioning strip faces the arc-shaped plate, the arc-shaped plate is connected in the vertical groove and moves up and down, an outer side surface of the arc-shaped plate is provided with a plurality of test strip placing grooves, the testing test strips are fixed in the plurality of test strip placing grooves, lower parts of the testing test strips are provided with tearing cracks at an identical horizontal height, the tearing cracks divide each testing test strip of the testing test strip into an upper section and a lower section, a length of the vertical groove is equal to a length of the lower section of the each testing test strip, the tearing cracks on the testing test strips are lower than a lower end part of the arc-shaped plate, a bottom end of the each testing test strips is lower than a top edge of the low liquid baffle, and the two positioning strips abut against the two testing card blocks of the plurality of testing card blocks, respectively.

7. The rotating seal-type liquid testing apparatus according to claim 6, wherein, magnetic conduction sheets or permanent magnet sheets are embedded in a middle part of a concave surface of the arc-shaped plate.

8. The rotating seal-type liquid testing apparatus according to claim 1, wherein, the upper cup component further comprises a connecting cylinder and a connecting ring plate, a middle part of an inner side surface of the connecting cylinder is fixed to an outer edge of the connecting ring plate, an inner edge of the connecting ring plate is fixed to a top end of the upper cup body, a bottom of the connecting cylinder is in a first threaded connection with a top of the lower cup body, and a top of the connecting cylinder is in a second threaded connection with the top cover.

9. The rotating seal-type liquid testing apparatus according to claim 1, wherein, the upper cup component further comprises a temperature test strip, and the temperature test strip is fixed at a bottom of an inner side surface of the upper cup body.

10. The rotating seal-type liquid testing apparatus according to claim 8, wherein, the bottom of the connecting cylinder is provided with an upper sealing line, and the top of the lower cup body is provided with a lower sealing line corresponding to the upper sealing line.

11. The rotating seal-type liquid testing apparatus according to claim 1, wherein, a first sealing ring is disposed between the upper cup component and the lower cup component, and a second sealing ring is disposed between the upper cup component and the top cover.

* * * * *